May 11, 1926.

B. P. DONNELLY

VEHICLE CURTAIN CONSTRUCTION

Original Filed Nov. 25, 1922

1,583,917

Inventor
Bernard P. Donnelly.
By Frank E. Liverance, Jr.
Attorney.

Patented May 11, 1926.

1,583,917

UNITED STATES PATENT OFFICE.

BERNARD P. DONNELLY, OF HOLLAND, MICHIGAN.

VEHICLE CURTAIN CONSTRUCTION.

Application filed November 25, 1922, Serial No. 603,196. Renewed March 31, 1926.

Figure 1:
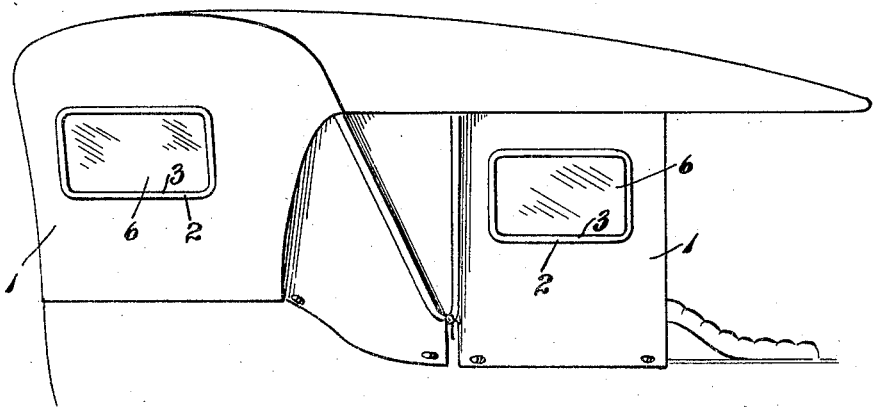

This invention relates to a curtain construction for vehicles, particularly automobiles. It is a primary object and purpose of the present invention to make a curtain, which is applicable either as the back curtain in automobile tops or for the side curtains therein, entirely of rubber except for the glass windows therein, a novel construction being used for the integral formation of the curtain and the border or frame part in which the glass is set, doing away entirely with the use of celluloid, as now largely used in side curtains and with the present fabric type of side and back curtains for automobiles, the curtain thus constructed being absolutely leak and rattle proof, while the installation is greatly simplified, eliminating all sewing labor and all frames which have been practically necessary for the carrying of glass in curtains heretofore. These and many other advantages will appear as understanding of the invention is had from the following description, taken in connection with the accompanying drawing in which, Fig. 1 is a perspective view of an automobile top having my invention and construction of curtain applied thereto.

Figure 2:
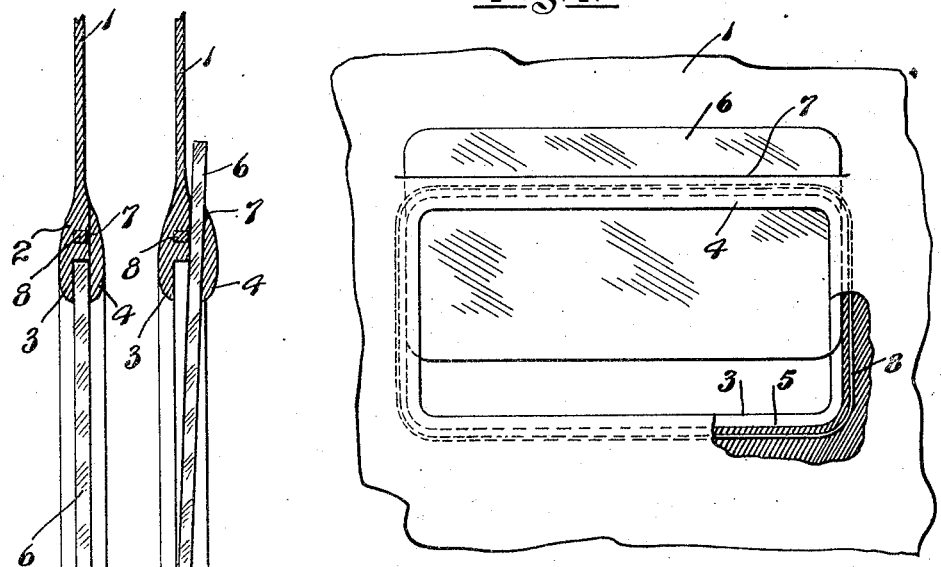
Figures 3, 4:
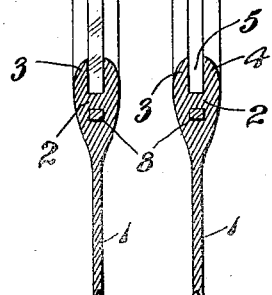

Fig. 2 is a fragmentary elevation with parts broken away and shown in section of the inner side of a curtain made in accordance with my invention, and Figs. 3 and 4 are fragmentary enlarged vertical sections through a curtain made in accordance with my invention, the glass being shown mounted in place in the first figure and in the act of being inserted in place in the latter figure.

Like reference characters refer to like parts in the several figures of the drawing.

The curtain, indicated at 1 is made wholly of rubber of a suitable grade and having suitable characteristics, being sufficiently resilient and elastic that it will stretch the desired amount, as hereafter defined; tough and durable to resist wear; and relatively thin yet strong so as not to be bulky and unsightly and still serve the purposes for which it is designed. Within the body of this curtain, a glass holding frame of any required size and design is formed by thickening the rubber of the curtain the necessary amount, as shown at 2, said frame on its inner sides having spaced apart inwardly extending lips 3 and 4 between which a groove 5 is made for receiving the edge portions of a piece of glass 6 which is to be held in said frame. The frame is integral with the curtain and of the same material, preferably, though, obviously, the quality of the rubber in the frame and curtain may be different, if desired. In order to quickly and readily install the plate of glass 6, a horizontally located slit 7 may be cut through the rubber of the frame on its inner side and through the upper horizontal member of the frame, the slit being in vertical alinement with the inner side of the lip 4 of the frame. Through this slit the glass is passed to the groove 5, as shown in Fig. 4 and is received and held in said groove. The position of the slit may be varied, as it may be in an end member of the glass holding frame and the glass slid in lengthwise in exactly the same manner. I have shown a strengthening and reinforcing rod 8 moulded in the frame part of the curtain around the groove 5 and this may be used or not as desired without changing the essential features of the invention.

The advantages of a curtain construction of this character are many. The use of a separate glass holding frame for the glass and the troubles and difficulties of installing the same are eliminated. The curtain and glass for the backs of automobile tops make a unit, bought as such from the manufacturer and there is no need, in the body trim department of an automobile factory to secure a separable frame in place in the curtain or attach the glass in the frame, as heretofore almost universally done where glass is used. And sewing for securing celluloid in place is obviated. In addition, the curtain material with the glass set therein as described may, for back curtains, be made large enough in the beginning so as to accommodate the largest size of back curtain that any automobile has, the curtain for smaller requirements being merely trimmed down to the necessary size. This obviates large expense in the doing away with the many different sizes now required, and which the dealers in such materials have to keep in stock at a heavy overhead expense. Further, for side curtains, the material of the curtain being elastic, may be stretched and drawn taut making a smooth appearance and tight enclosure, without the danger of destruction of the fastening means used for attaching the curtains in place, at present a source of constant trouble and annoyance. A top for summer use may be equipped readily for winter use at relatively small expense. If a glass is broken, it is replaced with a minimum of trouble.

The material used for the curtains, from its inherent qualities, makes a particularly effective curtain structure with integrally formed glass carrying parts therein, allows stretching to compensate for any irregularities in placing the attaching devices on the body of the automobile, makes a smooth and tight enclosure, allows ventilating holes and hand openings for operations of doors not equipped with outside handles, and is in every way preeminently practical and serviceable. The invention is defined in the appended claims and is to be considered as comprehensive of all forms of structure coming within the scope of said claims.

I claim:

1. A curtain for vehicle tops comprising a single elastic sheet of rubber having an opening therethrough, the material adjacent and around the edges of the opening being thickened and formed at its inner edges around said opening with spaced apart lips between which a transparent plate is placed, and means for holding said thickened portion against stretching to thereby retain the glass, substantially as described.

2. A curtain for vehicle tops comprising a single elastic sheet of rubber having an opening therethrough and formed with an integral thickened frame enlargement around the opening, the material adjacent the edges of the opening being grooved for the reception of a rigid transparent plate, means for holding said thickened portion against stretching to thereby retain the glass, and an elongated slit in one side of the said thickened portion through which the glass is passed to the groove.

3. A curtain for vehicle tops comprising an elastic sheet of material having an opening therethrough and formed with an integral thickened enlargement around said opening, grooved at its inner edges, a plate of glass seated in said groove, and an inelastic continuous length of material embedded in said thickened portion slightly spaced from and around the bottom of the groove.

4. A curtain for vehicle tops comprising a rubber sheet of material having an opening therethrough, said material forming the curtain being thickened and made into a frame around said opening, the frame and curtain being integral, and glass secured in said frame at said opening, substantially as described.

In testimony whereof I affix my signature.

BERNARD P. DONNELLY.